(No Model.)
T. J. LYNCH.
HARNESS AND SHAFT CONNECTION.
No. 318,005. Patented May 19, 1885.
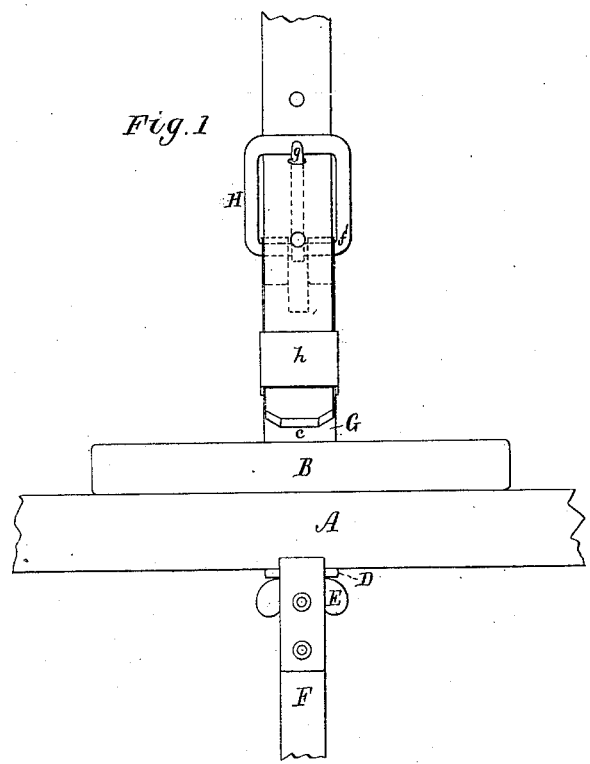
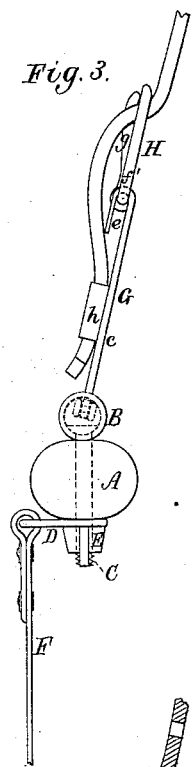
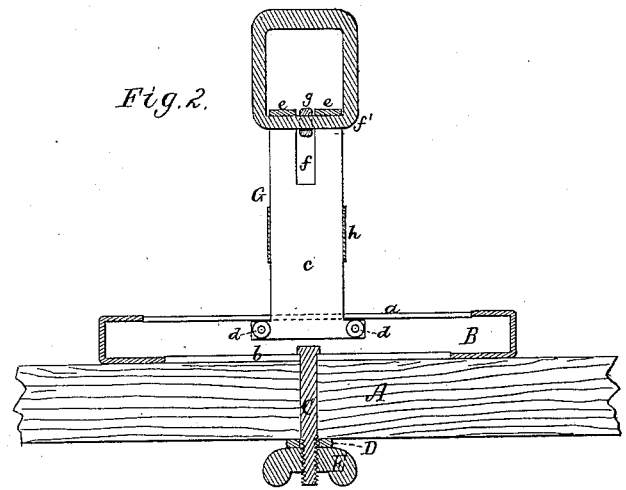
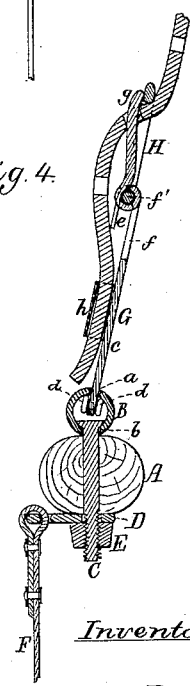
Witnesses
S. N. Piper.
Ernest B. Pratt.
Inventor,
Thomas J. Lynch.
by R. H. Eddy att'y.

UNITED STATES PATENT OFFICE.

THOMAS JOSEPH LYNCH, OF MILFORD, MASSACHUSETTS.

HARNESS AND SHAFT CONNECTION.

SPECIFICATION forming part of Letters Patent No. 318,005, dated May 19, 1885.

Application filed January 16, 1885. (No model.)

*To all whom it may concern:*

Be it known that I, THOMAS JOSEPH LYNCH, of Milford, in the county of Worcester, of the Commonwealth of Massachusetts, have invented a new and useful Improvement in Carriage Harness and Shaft Connections; and I do hereby declare the same to be described in the following specification, and represented in the accompanying drawings.

Figure 1 is a front view, Fig. 2 a longitudinal section, Fig. 3 an end view, and Fig. 4 a transverse section, of a carriage-shaft and my invention applied thereto, which is a substitute for the lug as generally employed for sustaining the thill of a wagon by the saddle of the harness of the horse.

When a lug is used, the shaft extends through it, and in time or soon becomes defaced, or more or less worn by the lug; but with my invention there follows no such injury to the shaft, the nature of such invention being defined in the claims hereinafter presented.

In carrying out my improvement there is placed on the upper edge of a shaft, A, a tube, B, closed at its ends and having in it longitudinally two slots, $a$ and $b$, one of which is in its upper and the other in its lower part. A screw-bolt, C, having its head within the bore of the tube, has its shank extending down through the lower slot, $b$, and also through the shaft A and a strap-carrier, D, arranged under such shaft. A nut, E, screwed on such bolt and against the strap-carrier, serves to draw the bolt downward, so as to fasten the tube B to the shaft. The tube is movable or adjustable on the shaft lengthwise thereof, in order to suitably adapt the connection to a horse according as his size may require—a large animal rendering it necessary to advance the tube and a small animal to retract it on the shaft.

The aforesaid strap-carrier is a metallic plate having a leather strap, F, projecting from it. To this strap the girth is to be buckled.

There extends through the upper slot of the tube a duplex-pronged hook, G, whose shank, $c$, at its lower part, is furnished with friction-rollers, $d$, to slide in the bore of the tube and retain the shank in connection with the tube. The hook has two prongs, $e\ e$, with a space, $f$, between them, it being to hook upon the ring $f'$ of a buckle, H, whose tongue, $g$, is to extend between the prongs. The said buckle is to be supposed to be buckled to the strap depending from the saddle of the harness. The shank of the duplex-pronged hook G is furnished with a loop, $h$, to receive the said strap.

As the horse may move forward or backward in the thills, the hook G will be correspondingly moved in the tube B.

With the duplex-pronged hook there will be no necessity of detaching the buckle from its strap, as the hook can be readily put into or raised out of connection with the buckle when it may be desirable to harness the horse to or unharness him from the shafts.

I claim—

1. The combination, with the side strap and its buckle of the saddle of a harness and with the carriage-shaft of the duplex-pronged hook extending upward from the latter and hooked upon the buckle-ring, as set forth.

2. The combination, with the side strap and its buckle of the saddle of a harness and with the carriage-shaft, of a duplex-pronged hook and a tube or carrier, the latter being fixed to the shaft, and such hook being movable in the said tube or carrier lengthwise thereof and extended upward therefrom and hooked upon the ring of such buckle, all being substantially as set forth.

3. The combination, with the side strap and its buckle of the saddle of a harness, of the duplex-pronged hook hooked upon the buckle, and of the tubular carrier fixed to the shaft by a clamp bolt and nut, and slotted to receive both hook and clamp-bolt, such being so as to enable either the hook or the carrier or both to be adjusted relatively to the shaft lengthwise thereof, as described, all being to operate substantially as set forth.

4. The duplex-pronged hook provided with the strap-receiving loop extending from the shank of such hook, as set forth, in combination with the carriage-shaft, and projecting upward relatively thereto, as represented.

5. The combination, with the shaft, of the buckle, its supporting-hook, and the slotted tube or carrier of the hook, all being arranged and to operate substantially as set forth.

THOMAS JOSEPH LYNCH.

Witnesses:
CHARLES B. WETHERBY,
WILLIAM A. HUSSEY.